US010212281B2

(12) United States Patent
Czachor, Jr. et al.

(10) Patent No.: US 10,212,281 B2
(45) Date of Patent: Feb. 19, 2019

(54) SYSTEM AND METHOD FOR HANDLING REPETITIVE CALLS AT CALL CENTER

(71) Applicant: ASD Inc., Media, PA (US)

(72) Inventors: Martin Czachor, Jr., Newtown Square, PA (US); Kevin Czachor, West Chester, PA (US); Norman Franke, Garnet Valley, PA (US)

(73) Assignee: ASD Inc., Media, PA (US)

( * ) Notice: Subject to any disclaimer, the term of this patent is extended or adjusted under 35 U.S.C. 154(b) by 0 days.

(21) Appl. No.: 15/612,849

(22) Filed: Jun. 2, 2017

(65) Prior Publication Data
US 2018/0352084 A1 Dec. 6, 2018

(51) Int. Cl.
| | | |
|---|---|---|
| *H04M 11/00* | (2006.01) | |
| *H04M 3/51* | (2006.01) | |
| *H04M 3/42* | (2006.01) | |

(52) U.S. Cl.
CPC ..... *H04M 3/5116* (2013.01); *H04M 3/42357* (2013.01); *H04M 2203/558* (2013.01); *H04M 2242/04* (2013.01); *H04M 2242/14* (2013.01); *H04M 2242/30* (2013.01)

(58) Field of Classification Search
CPC ........... H04M 3/5116; H04M 3/42357; H04M 2203/558; H04M 2242/04; H04M 2242/30; H04M 2242/14
USPC .............................. 379/45; 455/404.1, 404.2
See application file for complete search history.

(56) References Cited

U.S. PATENT DOCUMENTS

| | | | | |
|---|---|---|---|---|
| 7,315,734 | B2 * | 1/2008 | Friedenfelds | H04Q 3/64 379/45 |
| 2008/0304629 | A1 * | 12/2008 | Buscemi | H04M 3/4874 379/45 |
| 2009/0213844 | A1 * | 8/2009 | Hughston | H04M 3/4872 370/352 |
| 2010/0048162 | A1 * | 2/2010 | Ciesla | H04W 4/02 455/404.2 |
| 2010/0246781 | A1 * | 9/2010 | Bradburn | H04M 3/5116 379/45 |
| 2014/0192964 | A1 * | 7/2014 | Bhogal | H04M 3/5116 379/45 |
| 2014/0282934 | A1 * | 9/2014 | Miasnik | G06F 17/30861 726/5 |

* cited by examiner

*Primary Examiner* — Stella L. Woo
(74) *Attorney, Agent, or Firm* — Steven Meyer, Esq.

(57) ABSTRACT

A call center answers calls from callers reporting incidents and dispatch responders in response thereto. A computing system at the call center receives a particular call from a caller regarding a particular incident, and determines whether the particular call is an original call that is reporting the particular incident for a first time to the call center, or is a repetitive call that is reporting the particular incident after the original call for the particular incident has already been received by the call center. If an original call, the computing system forwards the particular call to an agent at the call center for further attention. However, if a repetitive call, the computing system diverts the particular call from the agent at the call center. Accordingly, the resources of the call center may be concentrated on original calls and away from repetitive calls.

17 Claims, 4 Drawing Sheets

SYSTEM AND METHOD FOR HANDLING REPETITIVE CALLS AT CALL CENTER

FIELD

The present disclosure relates generally to answering calls at a call center such as an emergency call center. More particularly, the present disclosure relates to handling repetitive calls at such call center, where the repetitive calls all likely relate to a single incident. Specifically, the present disclosure relates to a system and method that automatically interrogates each incoming call to identify whether the call likely relates to an already-identified incident, and that initially handles each incoming call in a predetermined automated manner if the incoming call has been identified as likely relating to an already-identified incident. Accordingly, the agents at the call center are not overly burdened by having to personally handle every incoming call related to the incident.

BACKGROUND

In many geographic areas, including municipalities, regional governmental areas, private oversight zones, and the like, emergency call centers are provided for quickly responding to incidents of an emergency nature and the like. Thus, it may be that a city or county maintains and operates such an emergency call center for the residents and visitors thereof who may come upon or be involved in an incident and wish to report such incident so that an appropriate response may be made by or on behalf of the call center.

Typically, in the United States, such a call center may be known as a '911 call center', for the reason that '911' has been established as an all-purpose emergency telephone calling number, or the like, and for the reason that calls to '911' initiated from within a predetermined geographic area are typically automatically routed to the 911 call center for such area. Presumptively, an individual initiating a 911 call that is to be routed to a local 911 call center is wishing to perform a public service by reporting an incident of an emergency nature so that the emergency incident can be responded to in an appropriate manner. Accordingly, it may be that the call-initiating individual is reporting to the call center an incident where he has witnessed smoke or fire, in which case the call center may respond to the incident by summoning a local fire department to investigate and handle the incident. Likewise, it may be that the call-initiating individual is reporting to the call center an incident where she was involved in an automobile accident, in which case the call center may respond to the incident by summoning a local police department, a paramedic squad, and an ambulance to investigate and handle the incident.

In at least some instances, an individual initiating a call to a call center to report an incident is indeed the only caller reporting the incident to the call center. Thus, a man calling to report a gas leak may be the only person aware of the gas leak and the only person calling to report same. In at least some other instances, an individual initiating a call to a call center to report an incident is one of several callers reporting the incident to the call center. Thus, a woman calling to report a neighbor's house on fire may be one of several people aware of the house fire and the third person calling to report same.

When only one person calls to report an incident, the call center receiving the call presumptively handles same in a relatively straightforward manner. For example, it may be that a live agent at the call center collects appropriate information regarding the incident, creates an incident report or the like corresponding to the incident, and dispatches an appropriate emergency response corresponding to the incident and the report thereof. Notably, the collected information regarding the incident may include an identification of the nature of the incident and the location of the incident, among other things.

Also notably, it may be that the call center itself automatically collects appropriate information regarding the incident, where such automatically collected information may be presented to the agent handling the received call and/or may be employed to direct the emergency response, among other things. For example, the automatically collected information may include a preliminary identification of the person calling to report the incident and an identification of a telephone number or the like of the person, based on the telephone or the like employed for the call. Perhaps more importantly, the automatically collected information may also include a geographic location of the person calling to report the incident, again based on the telephone or the like employed for the call. As may be appreciated, such geographic location may be among other things a predetermined address if the telephone is a landline telephone at such predetermined address, or may be a set of spatial coordinates if the telephone is a mobile telephone. In the latter case, and as is known, the spatial coordinates may be GPS (Global Positioning System) coordinates or the like as obtained directly from the telephone, or may be such coordinates or the like as obtained indirectly, perhaps by cell phone tower triangulation techniques, among other things.

When more than one person calls to report the same incident, the call center receiving the 'repetitive' calls presumptively handles each of the repetitive calls in a similar manner. Notably, it is to be appreciated that the call center receiving and handling all of the repetitive calls must dedicate resources that are essentially duplicative and therefore wasteful. In particular, multiple agents at the call center handling the repetitive calls are diverted from answering other calls regarding other incidents, and multiple call lines of the call center are tied up and unavailable, among other things. Also, in a stressful environment such as may be expected at a call center, it might be natural for a single agent at the call center handling multiple ones of the repetitive calls to be emotionally worn by same, especially if the corresponding incident is of a particularly horrific or gruesome nature.

In the instance where the number of repetitive calls corresponding to a particular incident is relatively low, say on the order of 2-5, the repetitive calls may be considered to be merely annoying, and perhaps an unavoidable aspect of the operation of a call center, but not overly burdensome, generally speaking. However, in the instance where the number of repetitive calls corresponding to a particular incident is relatively high, say on the order of 20-50 or even more, the repetitive calls may be considered to be a much more serious matter.

As but one example, consider an incident where multiple vehicles are involved in a crash on an urban highway. In such crash incident, it is likely that the occupants in the vehicles will call on mobile telephones to report same to a corresponding call center, if they are able to do so. Notably, and moreover, it is also likely that occupants of many vehicles on the highway passing the incident will call on mobile telephones to report the incident to the call center. Further, it is likely that many nearby pedestrians if present will call on mobile telephones to report the incident to the call center, and that people in nearby houses and other buildings will do same by way of mobile and landline telephones. As should be appreciated, most anybody nearby could be expected to call to report the incident, including pilots flying overhead, passengers on passing trains and buses, drivers on intersecting roadways, and the like. Additionally, people farther away might call too, if for example the incident produced smoke, or if a person heard from someone else about the crash and wanted to report same.

Quite simply, it is not unreasonable to expect the call center to be inundated with repetitive calls, all relating to the aforementioned crash incident, perhaps on the order of 500-1000 or even more if the crash incident is relatively severe and highly visible. It is also not unreasonable to expect the inundation at the call center to last for an hour or more. Anecdotally, it has been found that such inundations of repetitive calls from a single incident happen at call centers on a regular basis. Moreover, it has also been anecdotally found that the possibility of such inundations has required such call centers to increase staffing and line capacity to handle such inundations, all at great cost and expenditure of resources.

Accordingly, a need exists for a system and method for handling repetitive calls relating to a single incident at a call center. In particular, a need exists for such a system and method where an incident is identified from a call to the call center, and where further calls to the call center are identified as being potentially related to the identified incident. Further, a need exists for such a system and method where the potentially related calls are at least initially automatically handled to determine whether such potentially related calls are in fact repetitive calls and if so are diverted from agents at the call center.

SUMMARY

The aforementioned needs are satisfied by a method performed by a computing system of a call center established to answer calls from callers reporting incidents and dispatch responders in response thereto. The computing system receives a particular call from a caller regarding a particular incident, and determines whether the particular call is an original call that is reporting the particular incident for a first time to the call center, or is a repetitive call that is reporting the particular incident after the original call for the particular incident has already been received by the call center. If the particular call is an original call, the computing system forwards the particular call to an agent at the call center for further attention. However, if the particular call is a repetitive call, the computing system diverts the particular call from the agent at the call center. Accordingly, the resources of the call center may be concentrated on original calls and away from repetitive calls.

In the course of determining whether the particular call is an original call or a repetitive call, an automated processing system may be employed to communicate with the caller. If the caller is calling from a landline or mobile telephone, the automated processing system may provide voice prompts and collect voice or keypad responses. If the caller is calling by way of a textual-based system such as a text messaging service or an email service or the like, the automated processing system may provide text-based prompts and collect appropriate text-based responses. Presumptively, once the computing system with such automated processing system determines that the particular call is an original call, the particular call escapes out to an agent for further handling. Note that with an automated processing system, the caller provide details in a free-form manner, via voice message, text message, email message, or the like, and the details can be reviewed at an appropriate time if need be.

BRIEF DESCRIPTION OF THE DRAWINGS

The foregoing summary as well as the following detailed description of various embodiments of the present innovation will be better understood when read in conjunction with the appended drawings. For the purpose of illustrating the various embodiments of the innovation, there are shown in the drawings embodiments that are presently preferred. As should be understood, however, the innovation is not limited to the precise arrangements and instrumentalities shown. In the drawings.

DETAILED DESCRIPTION OF PREFERRED EMBODIMENTS

Figure 1:
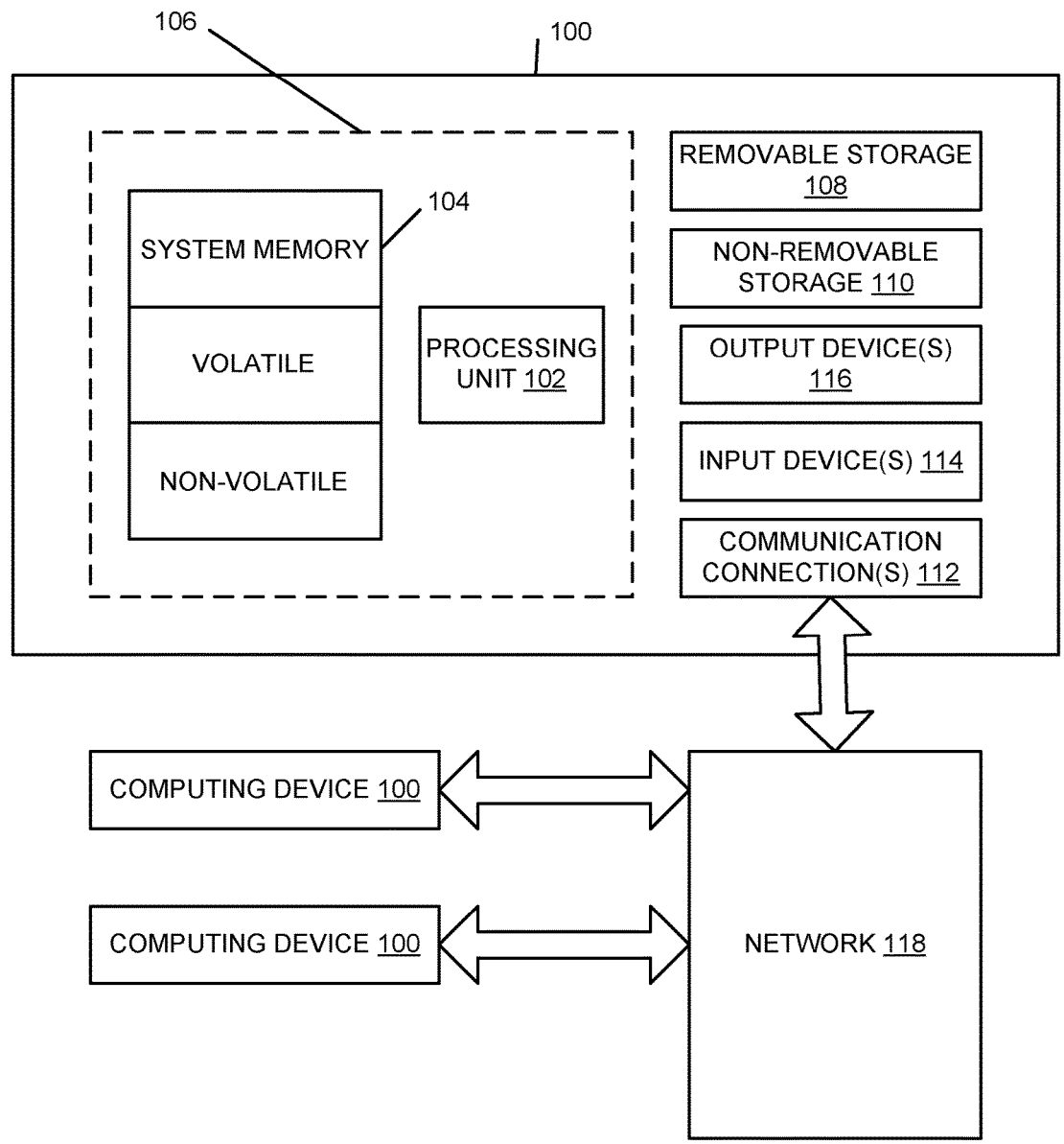
FIG. 1 is a block diagram of an example of a computing environment within which various embodiments of the present innovation may be implemented.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a tip" includes a plurality of tips. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Example Computing Environment

FIG. 1 is set forth herein as an exemplary computing environment in which various embodiments of the present invention may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal data devices such as 'smart' mobile telephones, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features and functionality. For example, computing device 100 may include additional storage (removable and/or non-removable) including, but not limited to, magnetic or optical disks or tape. Such additional storage is illustrated in FIG. 1 by removable storage 108 and non-removable storage 110, and can encompass cloud-based storage if deemed necessary and/or advisable.

Computing device 100 typically includes or is provided with a variety of computer-readable hardware media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other computer-readable hardware medium which can be used to store the desired information and which can be accessed by computing device 100. Any such computer storage media may be part of computing device 100.

Computing device 100 may also contain communications connection(s) 112 that allow the device to communicate with other devices 100. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection (including VoIP), and wireless media such as a Wi-Fi or cellular data network or the like, acoustic, radio frequency (RF), infrared and other wireless media. The term computer-readable media as used herein includes both storage media and communication media.

Computing device 100 may also have input device(s) 114 such as keyboard, mouse, pen, audio input device, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as a Wi-Fi or cellular data network or the like, the Internet or the like. Likewise, the network 118 may be such an external network.

Particularly in the case where the network 118 is an external network, such network 118 may be a digitally based network (including VoIP) for exchanging computer data among the devices 100, may be an audio and/or video network for exchanging audio and/or video data among the devices 100, or the like. Thus, it may be that the network 118 may be a public switched telephone network for landline telephone communications, a mobile switching center for wireless telephone communications, a paging network for distributing paging information, a private multimedia network for establishing videoconferencing, or the like. Thus, it should be appreciated, that one or more of the computing devices 100 that are shown to the left of the network 118 in FIG. 1 may be a mobile telephone, a landline telephone, a pager, a mobile electronic mail device, a desktop electronic mail device, a mobile electronic texting device, a desktop electronic texting device, or a combination thereof, or the like, with appropriate hardware and software instantiated thereon.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing and implementing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Call Center

Figure 2:
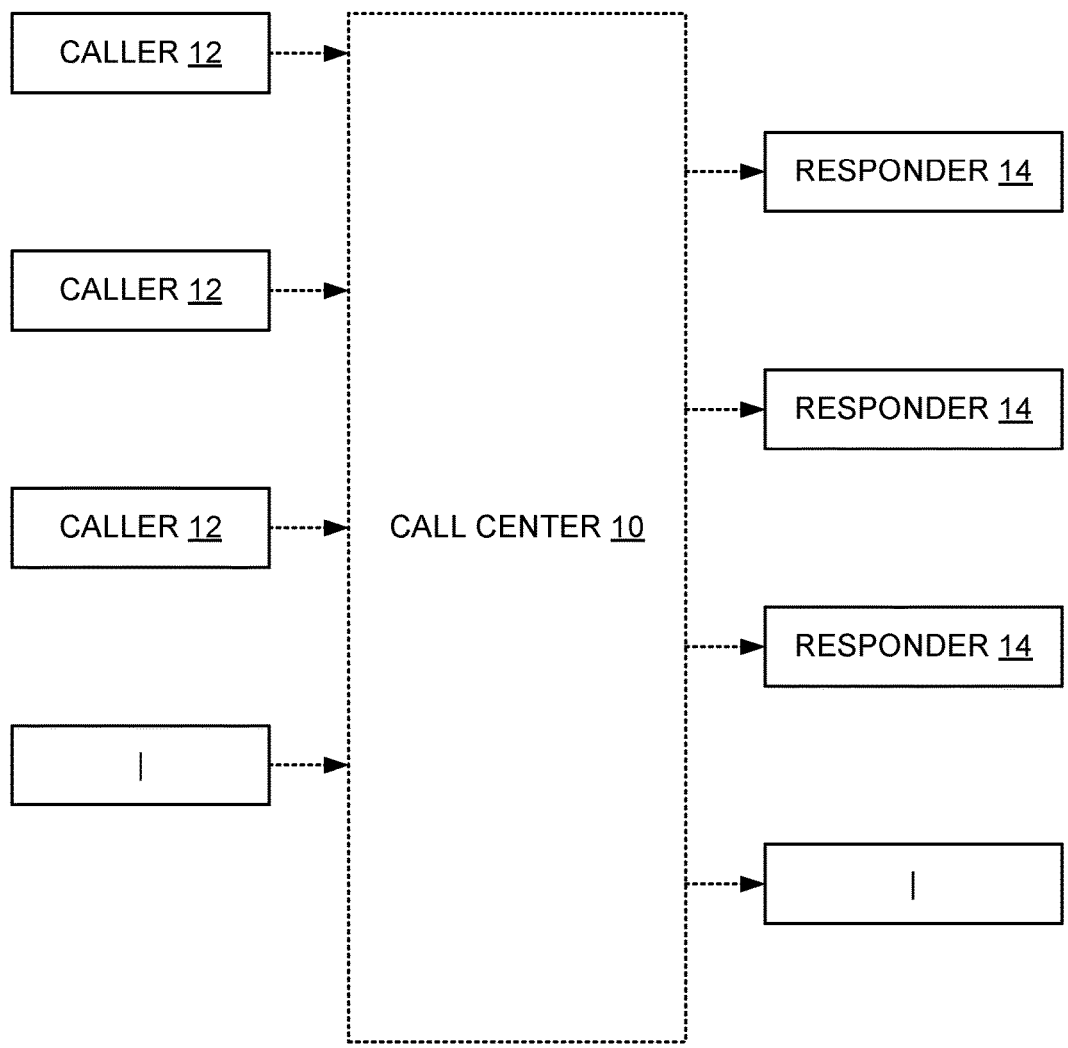
FIG. 2 is a block diagram showing a call center provided to answer calls or the like from callers or the like reporting particular incidents and seeking appropriate responses thereto.
Figure 3:
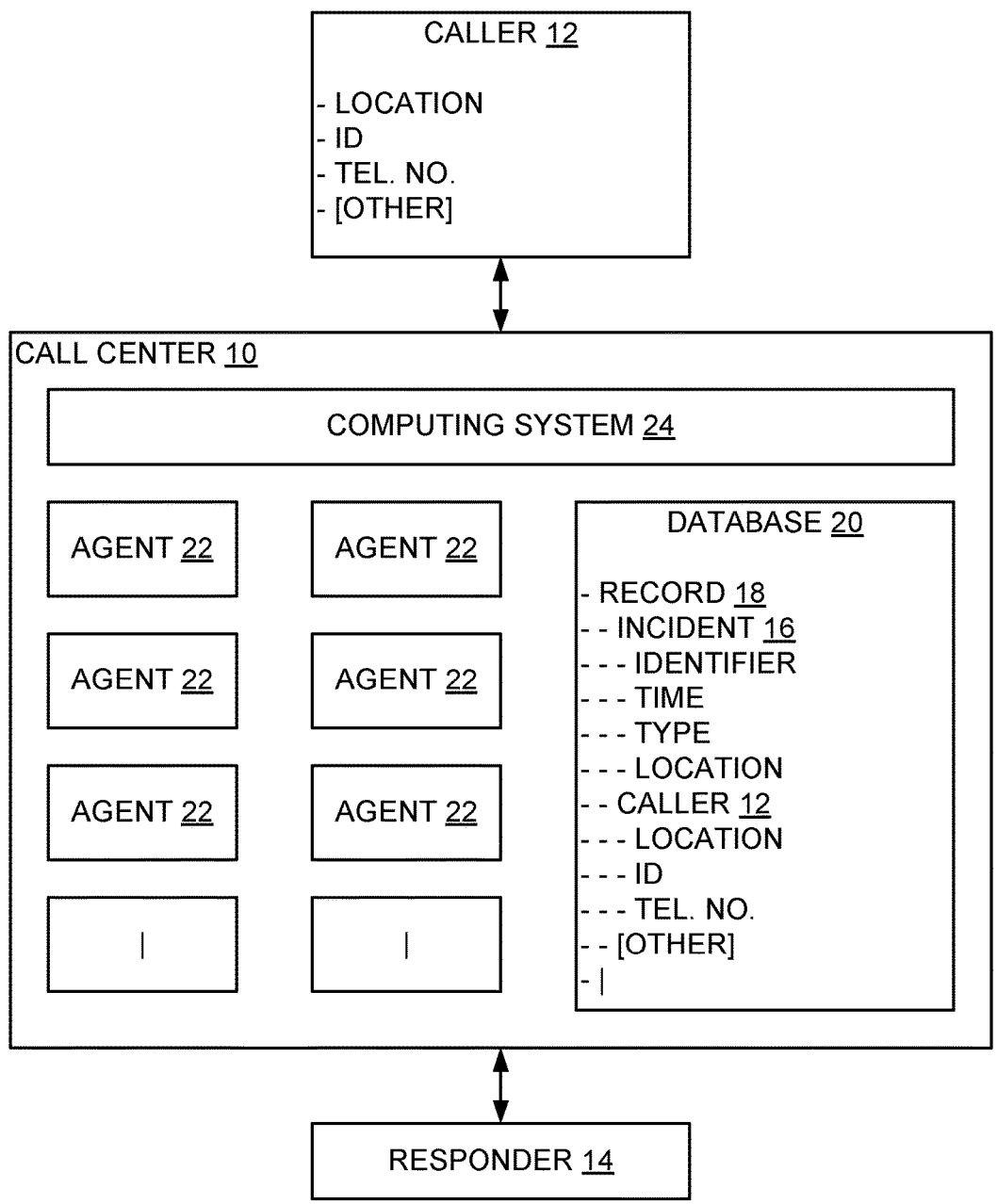
FIG. 3 is a block diagram of a computing system in the call center of FIG. 2 for answering the calls from the callers of FIG. 2 in accordance with various embodiments of the present innovation.

Turning now to FIGS. 2 and 3, it is seen that a call center 10 such as a 911 call center is provided in accordance with various embodiments of the present innovation. Typically, although by no means necessarily, the call center 10 is established to answer calls within a predetermined geographic region from callers 12 who are calling to report incidents 16 of an emergency nature, among other things. The geographic region serviced by the call center 10 may be most any geographic region without departing from the spirit and scope of the present innovation. For example, the geographic region may encompass an area such as a municipality or multiple ones thereof, a county or multiple ones thereof, a state or multiple ones thereof, or any other defined geographic zone. As should be appreciated, the call center 10 may be provided as a public or private service to quickly respond to the aforementioned incidents 16 of an emergency nature and the like so that residents and visitors who come upon or are involved in an incident 16 may as callers 12 report such incident. Upon receiving such report of such incident 16, and as is to be understood, the call center 10 may then summon an appropriate responder 14 to effectuate an appropriate response. Thus, such call center 10 may answer all types of calls and dispatch same to all types of responders 14, or such call center 10 may answer only certain types of calls and dispatch same to only certain types of responders 14. For example, the call center 10 may provide access to all responders 14, or to just police, in which case the call center 10 may be associated with a police station or the like.

Typically, the caller 12 is calling the call center 10 by way of a calling device such as a landline or mobile telephone or the like, although it is to be appreciated that such caller 12 may also be calling by way of other means, such as for example by way of a texting service, an email service, a radio service, and the like. As known, the caller 12 may call the call center 12 by way of a predetermined emergency identifier, such as the '911' telephone number in the United States, or the like, although the caller 12 may also employ any other appropriate identifier without departing from the spirit and scope of the present innovation. As was pointed out above, the '911' identifier is known as an all-purpose emergency telephone calling number in which any call from a caller 12 to '911' initiated from within a predetermined geographic area is automatically routed to the 911 call center for such area.

The incident 16 being reported a particular caller 12 may be most any incident 16 without departing from the spirit and scope of the present innovation, although presumptively the incident 16 should truly be of an emergency nature. Thus, it may be that the caller 12 is reporting smoke or fire, in which case the call center 10 may respond by summoning a responder 14 such as a local fire department, or is reporting a crime in progress, in which case the call center may respond by summoning a responder 14 such as a local police department, among other things. Generally, the typical operation of a call center 10 responding to a call thereto from a caller 12 by summoning an appropriate responder 14 is known or should be apparent to the relevant public and therefore need not be set forth herein in any detail other than that which is provided.

Call-Handling

For purposes of the present innovation, a call from a caller 12 to a call center 10 to report a particular incident 16 may be classified as an original call that is reporting the particular incident 16 for the first time to the call center 10, or as a repetitive call that is reporting the particular incident 16 after the original call for the particular incident has already been received by the call center 10. Thus, a call from a first caller 12 calling to report the particular incident 16 is an original call, while all calls from subsequent callers 12 calling to report the particular incident 16 are repetitive calls.

As was pointed out above, if a caller 12 reporting an incident 16 is indeed the only caller 12 reporting same to the call center 10, or if the caller 12 reporting the incident 16 is the first of multiple callers 12 reporting same to the call center 10, such call center 10 handles what should be understood to be an original call in a relatively straightforward manner. Typically, and as should be appreciated, a live agent 22 or perhaps an automated agent 22 at the call center 10 collects appropriate information regarding the incident 16, creates an incident report or the like corresponding to the incident 16, and dispatches an appropriate emergency responder 14 corresponding to the incident 16 and the report thereof. Notably, the collected information regarding the incident 16 may include an identifier for the incident 16, a time associated with the call for the incident 16, an identification of the type or nature of the incident 16, and the location of the incident 16, among other things. Note here that the location of the incident 16 may comprise the location of the caller 12, perhaps as automatically determined from the calling device thereof, and/or the location of the incident 16 itself, perhaps as orally collected from the caller 12. Also typically, such collected information for the incident 16 is appropriately stored as a record 18 or the like in a database 20 or the like at or accessible to the call center 10. Such record 18 and database 20 for the incident 16 are generally known or should be apparent to the relevant public and therefore need not be set forth herein in any detail other than that which is provided. As should be understood, the collected information as stored in the database 20 may be employed for a variety of purposes, such as for example generating statistics regarding the call center 10, auditing the performance of the call center 10, and otherwise referring back to one or more of the incidents 16 as may be necessary and/or desirable.

As was alluded to above, collecting such information regarding an incident 16 may be performed by way of the agent 22 at the call center and/or by way of appropriate automated technology. Notably, in addition to information collected by an agent 22, or in the alternative, it may be that the call center 10 itself automatically collects certain information regarding the incident 16, where such automatically collected information may be presented to the agent 22 handling the call and/or may be employed to direct the emergency response, among other things. Automatically collecting information in the manner performed with regard to the call center 10 may be performed in any appropriate manner without departing from the spirit and scope of the present innovation. Such automatic collection of such information at the call center 10 is known or should be apparent to the relevant public and therefore need not be set forth herein in any detail other than that which is provided.

As may be appreciated, the automatically collected information may include a preliminary identification of the caller 12 reporting the incident and an identification of a telephone number or other identifier of the caller 12, based on the calling device employed by the caller 12 for the call. Perhaps more importantly, the automatically collected information may also include a geographic location of the caller 12, again based on the calling device employed for the call. As may be appreciated, such geographic location may be among other things a predetermined address if the calling device is for example a landline telephone at such predetermined address, or may be a set of spatial coordinates (GPS coordinates, for example) if the calling device is for example a mobile telephone. In the latter case, and as is known, the spatial coordinates are typically obtainable directly from the calling device, or indirectly, perhaps by cell phone tower triangulation techniques, among other things. As should also be appreciated, the automatically collected information may include any other appropriate information without departing from the spirit and scope of the present innovation.

Particularly with regard to FIG. 3, it is seen with regard to various embodiments of the present innovation that the call center 10 includes or employs a computing system 24 effectuating the interaction among the agents 22, the database 20, the callers 12, and the responders 14, among other things. Typically, although by no means necessarily, the computing system 16 is in the nature of the computing device 100 on the top part of FIG. 1 with appropriate hardware and software instantiated thereon, each agent 22 employs an individual computing device 100 tailored to the needs thereof, and the database 20 is instantiated on another computing device 100 also tailored to the needs thereof, where all computing devices 100 are appropriately communicatively coupled. Here, it is to be appreciated that the computing system 24 may among other things include incoming connections for receiving calls from the callers 12 and outgoing connections for sending requests to responders 14. As may be appreciated, the calls may be in the nature of voice calls or data calls such as electronic mail messages, text messages, or other data messages, and likewise the connections may be in the nature of voice, data, or other electronic connections. In at least some circumstances, the incoming and outgoing connections may be one and the same.

Handling Repetitive Calls

When more than one caller 12 calls to report the same incident 16, it is to be appreciated that most if not all of the pertinent details regarding the incident 16 are collected from the original call for such incident 16, and that the repetitive calls for such incident 16 typically include little if any further pertinent details regarding such incident 16. That is to say, once a call center 10 receives an original call for an incident 16 and acts upon same, repetitive calls for such incident 16 likely provide no further details of any particular importance. Accordingly, in various embodiments of the present innovation, the call center 10 identifies such repetitive calls and handles same in a manner different than such original calls.

As was point out above, handling repetitive calls differently from original calls is desirable for reasons relating to efficiency and resource allocation at the call center 10. In particular, it is to be appreciated that the call center 10 receiving and handling such repetitive calls must dedicate resources that are essentially duplicative and therefore wasteful. More importantly, in instances where the number of repetitive calls for a particular incident 16 is relatively high, say on the order of 20-50 or even more, the repetitive calls may inundate the call center 10 to the point where the call center 10 is swamped with such repetitive calls and cannot address original calls relating to other incidents, which of course is a serious matter.

Anecdotally, it has been reported that such inundation and corresponding swamping occurs on a regular basis at many if not all call centers 10 whenever an incident 16 occurs that may be considered major, and/or whenever such incident 16 is highly reported by callers 12. With regard to the latter, it is to be appreciated that the problem is exacerbated by the fact that most everyone has a mobile calling device such as a mobile telephone or the like that can easily be used to report and/or re-report incidents 16. As was pointed out above, in an incident 16 where vehicles are involved in a crash on a highway, callers 12 reporting the incident 16 may include the occupants in the vehicles on mobile telephones, passing vehicles on the highway on mobile telephones, nearby pedestrians on mobile telephones, people in nearby houses and other buildings on mobile and landline telephones, and most anybody else nearby. Moreover, callers 12 can even include people farther away for any of a variety of reasons. An urban city with a call center 10 having 100 agents 22 might be swamped by 1000 calls for such an incident 16, and a rural county with a call center 10 having 10 agents 22 might be swamped by 100 calls for such an incident 16. In either case, the call center 10 can become paralyzed by the inundation of repetitive calls, and the inundation can last for an hour or more.

Figure 4:
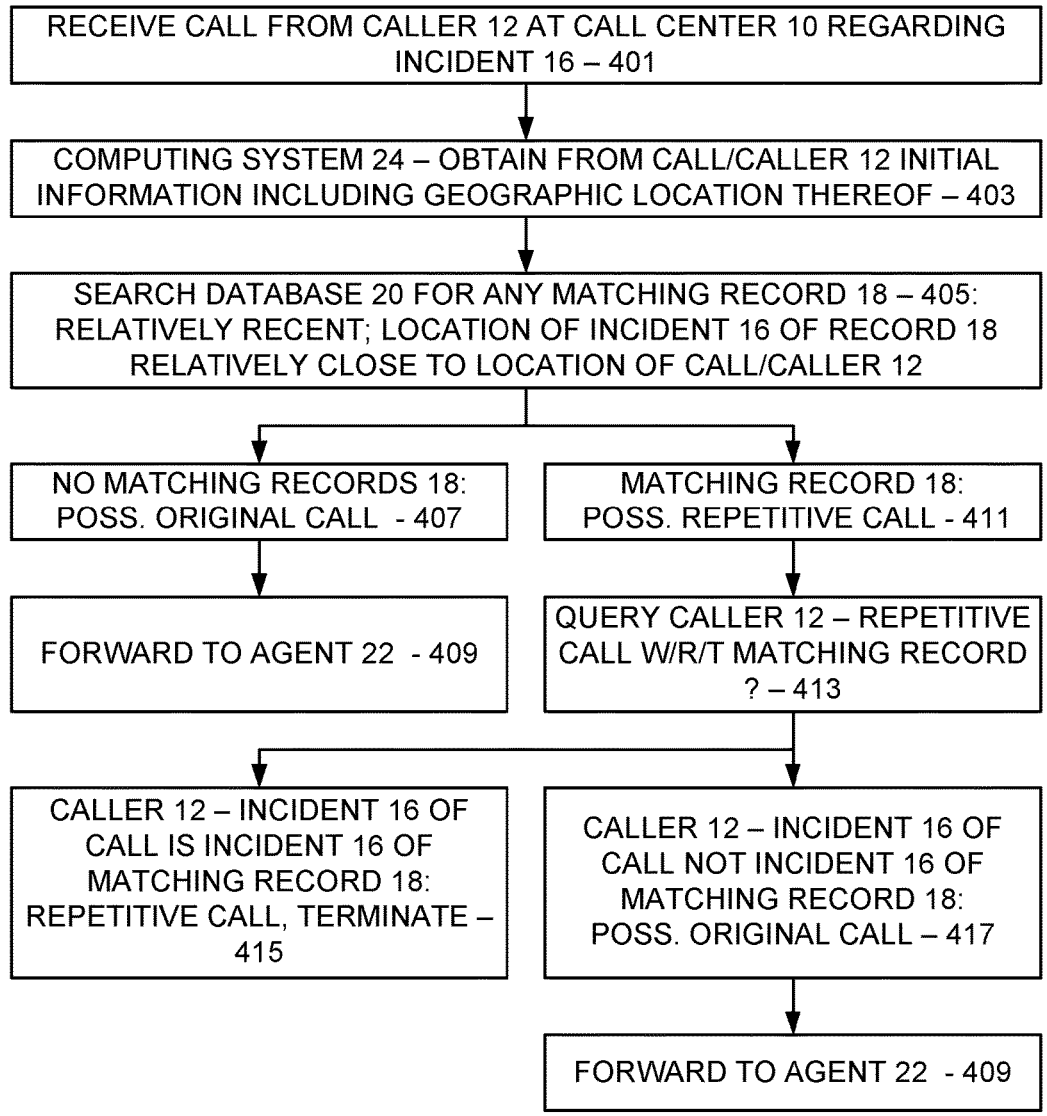
FIG. 4 is a flow diagram showing actions performed by the computing system of FIG. 3 in accordance with various embodiments of the present innovation.

In any event, and turning now to FIG. 4, in various embodiments of the present innovation, the call center 10 handles repetitive calls differently from original calls by identifying the repetitive calls and then diverting the repetitive calls to be handled differently than the original calls. For each call from a caller 12 to the call center 10, the computing system 24 thereof first interrogates information relating to the call to determine a geographic location relating to the call, and then checks the database 20 for a record 18 therein that is relatively recent and that has a similar geographic location. If so, the computing system 24 then queries the caller 12 to determine whether the incident 16 of the caller and the incident 16 of the record 18 are the same incident 16. If so, the call from the caller 12 is determined to be a repetitive call and not an original call and is diverted from the attention of the agents 22 at the call center 10.

Note that in diverting the call, it may be that the call is terminated, perhaps after an appropriate message is played to the caller, or that the call is terminated only after the caller 12 is given an opportunity to leave a message. In the latter instance, the caller 12 can add details regarding the incident 16 that are believed to be pertinent, perhaps by way of an automated processing system with appropriate prompts and an appropriate response collection system. As alluded to above, the automated processing system may provide voice prompts and collect voice or keypad responses, or may provide text-based prompts and collect appropriate text-based responses, or the like. Thus, the caller 12 can provide details in a free-form manner, via voice message, text message, email message, or the like, and the details can be reviewed at an appropriate time if need be.

In particular, and as is shown in FIG. 4, for any call from a caller 12 to the call center 10 reporting an incident 16, such call is received (401) and is first acted upon by the computing system 24 at the call center 10. Specifically, the computing system 24 obtains from the call/caller 12 initial information including a geographic location thereof (403), as well as other information including a preliminary identification of the caller 12 reporting the incident and an identification of a telephone number or other identifier of the caller 12, based on the calling device employed by the caller 12 for the call.

So that an agent 22 need not be troubled in order to collect such initial information, and in various embodiments of the present innovation such obtained initial information as at 403 is collected by the computing system 24 in an automated manner. For example, the preliminary identification of the caller 12 reporting the incident and an identification of a telephone number or other identifier of the caller 12 may be collected by way of Caller ID information transmitted with the call from the caller 12, or by way of a DNIS (Dialed Number Identification System) lookup. Likewise, a geographic location of the caller 12 may be collected based on the calling device employed for the call and specifically a GPS location thereof as determined at such calling device and transmitted with the call, or by cell phone tower triangulation techniques, among other things. As should be appreciated, the initial information automatically collected by the computing system 24 from the caller 12 as at 403 may include any other appropriate information without departing from the spirit and scope of the present innovation. Collecting such initial information is generally known or should be apparent to the relevant public and therefore need not be set forth herein in any detail other than that which is provided.

With such initial information relating to the call from the caller 12, the computing system 24 then searches the database 20 for any matching record 18 of an incident 16 where the incident 16 is relatively recent and where the incident 16 has a corresponding location that is relatively close to the geographic location of the call/caller 12 as was obtained at 403 (405). Presumptively, the computing system 24 may find zero, one, or multiple ones of such a record 18 in the database 20.

Determining whether an incident 16 of a record 18 in the database 20 is relatively recent may be performed in any appropriate manner and based on any appropriate standard without departing from the spirit and scope of the present innovation. For example, the computing system 24 presumptively has access to an accurate clock and can therefore determine how much time has elapsed since a time of an incident 16 of a particular record 18 in the database 20. Thus, it may be a simple rule that an incident 16 of a record 20 is relatively recent if the elapsed time since such incident 16 is less than an hour, or less than two hours, or less than 30 minutes, etc. Correspondingly, it may be a more complicated rule that an incident 16 of a record 20 is relatively recent if the elapsed time since such incident 16 is less than a set amount of time corresponding to a type of the incident 16. Thus, for a house fire, the set amount of time might be an hour, while for a heart attack victim the set amount of time might be 30 minutes, for example. Likewise, it may be an even more complicated rule that an incident 16 of a record 20 is relatively recent if the elapsed time since such incident 16 is less than a set amount of time corresponding to a location of the incident 16. Thus, for a more urban location, the set amount of time might be an hour, while for a more rural location the set amount of time might be 30 minutes, for example. It may even be that the set amount of time may vary according to a current time of day, or day of year, among other things. As should now be appreciated, determining whether an incident 16 of a record 18 in the database 20 is relatively recent may be performed in most any manner as long as the manner is reasonable based on logic and circumstances.

In a similar way, determining whether an incident 16 is relatively close to the geographic location of the call/caller 12 may also be performed in any appropriate manner and based on any appropriate standard without departing from the spirit and scope of the present innovation. Here, preliminarily, it is to be appreciated that a record 18 in the database 20 may have one location associated with the caller 12 of such record 18 and another location associated with the incident 16 of such record 18, such as may be the case where the caller 12 of such record 18 was geographically removed from the incident 16 of such record 18. In such an instance, it may be that only one of the locations is employed, or that both are employed. Also, preliminarily, it is to be appreciated that for a particular location to be most useful in determining closeness, it is likely that such location should be represented as a set spatial coordinates, such as for example latitude and longitude, and perhaps even vertical elevation too. Thus, for purposes of the present innovation, locations should be represented in a spatial coordinate system such as a GPS coordinate system or the like.

With regard to determining whether an incident 16 is relatively close to the geographic location of the call/caller 12, the computing system 24 presumptively can perform spatial distance calculations based on spatial coordinates and can therefore determine a distance between any two locations. Thus, it may be a simple rule that an incident 16 of a record 20 is relatively close to the geographic location of the call/caller 12 if the calculated distance therebetween is less than a mile, 500 feet, etc. Correspondingly, it may be a more complicated rule that an incident 16 of a record 20 is relatively close to the geographic location of the call/caller 12 if the calculated distance therebetween is less than a set distance corresponding to a type of the incident 16. Thus, for a car crash, the set distance might be 2000 feet, while for a plane crash, the distance might be 3 mile, for example. Likewise, it may be an even more complicated rule that an incident 16 of a record 20 is relatively close to the geographic location of the call/caller 12 if the calculated distance therebetween is less than a set distance corresponding to a location of the incident 16. Thus, for a more urban location, the set distance might be a tenth a mile, while for a more rural location the set distance might be 2 miles, for example. It may even be that the set distance may vary according to a current time of day, or day of year, among other things. As should now be appreciated, determining whether an incident 16 of a record 18 in the database 20 is relatively close may be performed in most any manner as long as the manner is reasonable based on logic and circumstances.

In various embodiments of the present innovation, determining whether an incident 16 of a record 18 in the database 20 is relatively close to the geographic location of the call/caller 12 is performed taking into account the type of the incident and a corresponding geographic zone tailored to the type of incident 16. For one example, if the type of incident 16 is a highway auto accident, it is likely that callers 12 calling repetitive calls into the call center 10 would do so from a relatively large distance along such highway, and perhaps from a relatively small area on either side of the highway relatively close to the location of the auto accident. Accordingly, in such a type of incident 16, it may be that an incident 16 of a record 18 in the database 20 is relatively close to the geographic location of the call/caller 12 if the call/caller 12 is on the highway of the auto accident within a relatively large distance from the auto accident, perhaps 5 miles or so, or if the call/caller 12 is off the highway of the auto accident within a relatively small distance from the auto accident, perhaps a half mile or so. Note here that in addition to a highway auto accident, a similar geographic zone may be tailored for other particular types of incidents 16, such as for example a train-related accident along a railroad line, a plane crash along a flight path thereof, etc.

As should be appreciated, in such a scenario, it should be known to the computing system 24 of the call center 10 that an auto accident is on a particular highway, and also the computing system 24 should be able to determine that a call/caller 12 is on the particular highway. To that end, it may be advisable to include within the database 20 for a 'highway auto accident' type of incident 16 a sub-type listing the particular highway. More generally, it should be appreciated that defining a geographic zone tailored to a particular type of incident 16, and determining whether a call/caller 12 is on a particular highway, may be performed in any appropriate manner without departing from the spirit and scope of the present innovation. Such actions should be known or at least apparent to the relevant public and therefore need not be set forth herein in any detail other than that which is provided.

Thus far, a call is received at a call center 10 from a caller 12 as at 401, the computing system 24 finds the geographic location of the call/caller 12 as at 403, and the computing system 24 searches the database 20 for any matching record 18 of an incident 16 where the incident 16 is relatively recent and where the incident 16 has a corresponding location that is relatively close to the geographic location of the call/caller 12 as at 405. If the computing system 24 finds no matching records 18, it may be presumed that the call from the caller 12 is an original call (407), and such original call may then be forwarded to an agent 22 at the call center 10 for further processing (409). Such processing is known or should be apparent to the relevant public and therefore need not be set forth herein in any detail other than that which is provided. Generally, the agent 22, which may be a live agent or an automated agent, for example, collects information relating to what is presumably a new incident 16, and dispatches an appropriate responder 14 to address the new incident 16. Also, the collected information for the new incident 16 is stored in a new record 18 in the database 20 in an appropriate format (such as that shown in FIG. 3). As may be appreciated, such record 18 and database 20 may take any appropriate form without departing from the spirit and scope of the present innovation as long as the record 18 and database 20 can be searched in accordance with the present innovation and specifically in accordance with 405. Thus, a subsequent caller 12 calling the call center 12 regarding the new incident 16 will hopefully result in the new record 18 being identified as a matching record 18 as at 405, and will be treated as a possible repetitive call in the manner set forth below.

Specifically, if the computing system 24 finds a matching record 18 (411), and in various embodiments of the present innovation, the computing system 24 responds to the caller 12 of the received call as at 401 by querying such caller 12 in an effort to determine whether the call is a repetitive call with regard to such matching record (413). In particular, it may be that the computing system employs an automated querying system that plays or relays a relevant message to the caller 12. Such relevant message may be any appropriate message without departing from the spirit and scope of the present innovation. Presumptively, the relevant message would among other things thank the caller 12 for calling, and query the caller 12 whether the call is regarding the incident 16 of the matching record 18. Also, presumptively, the incident 16 of the matching record 18 is provided in the relevant message with sufficient specificity so that the caller 12 can decide whether the incident 16 of the call and the incident 16 of the matching record 18 are the same incident 16.

The caller 12 may respond to the relevant message in a manner that positively confirms that the incident 16 of the call has already been reported to the call center 10 as the incident 16 of the matching record 18, in which case the call is a repetitive call (415). If so, the computing system 24 may then play a message notifying the caller 12 that a responder 14 has already been dispatched, and then may terminate the call from the caller 12, or may collect from the caller 12 any details deemed relevant, as was alluded to above with regard to an automated processing system. Crucially, an agent 22 need not be employed to service the repetitive call, and the agent 22 is thus free to address more pressing matters. If deemed necessary or advisable, the computing system 24 may also update the database 20 to reflect the repetitive call, such as for example by advancing a repetitive call counter for the matching record 18, or by creating a record relating to the repetitive call in an appropriate database. Note, though, that creating such a record relating to the repetitive call in the database 20 may be inadvisable if such record for such repetitive call in such database 20 could be identified as a matching record 18 for a subsequent call. As should be understood, only records 18 for original calls should be searched as potential matching records 18 as at 405.

The caller 12 may alternately respond to the relevant message in a manner that does not confirm that the incident 16 of the call has already been reported to the call center 10 as the incident 16 of the matching record 18, or at least that the caller 12 is unsure (417). If so, the computing system 24 may then take an appropriate action such as for example transferring the call and the caller 12 to an agent 22 for further processing as at 409. In such case the call is at least potentially an original call. As should be understood, the agent 22 may handle the potentially original call by first determining whether same is in fact an original call, and if so by collecting information relating to a new incident 16, and dispatching an appropriate responder 14 to address the new incident 16. Again, the collected information for the new incident 16 is stored in a new record 18 in the database 20, and any subsequent caller 12 calling the call center 12 regarding the new incident 16 will hopefully result in the new record 18 being identified as a matching record 18 as at 405.

If the computing system 24 finds multiple matching records 18 as at 411, it may be that the computer system 24 serially queries the caller 12 regarding each matching record 18 as at 413. Hopefully, the number of matching records 18 at issue is relatively small, perhaps no more than 2 or 3, or else the call may become overly long and complicated, at least as perceived by the caller 12. If instead, the number of matching records 18 at issue is relatively large, perhaps on the order of 5-10 or more, it may be best for the computing system to forego the automated querying of 413 et seq. and instead to transfer the call and the caller 12 to an agent 22 for further processing, even if the call could potentially be a repetitive call.

CONCLUSION

The programming believed necessary to effectuate the processes performed by the computing system 24 and the database 20 in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, a method and mechanism are set forth for handling repetitive calls in a call center 10 or the like. Based on a location of a caller 12, incidents 16 known to the call center 10 are queried to determine whether a known incident 16 is relatively recent and relatively close to the caller 12. If so, the known incident 16 is at least potentially the incident of the call and caller 12, and the caller 12 may be appropriately queried to confirm that the call is indeed a repetitive call. Again, an agent 22 need not be employed to service the repetitive call, and the agent 22 is thus free to address more pressing matters.

It should be appreciated that changes could be made to the embodiments described above without departing from the innovative concepts thereof. For example, although the present innovation is set forth with specific reference to an emergency-type call center 10, such innovation may also be practiced by any other appropriate type of call-receiving entity that wishes to handle repetitive calls efficiently. Moreover, although the present innovation is set forth primarily in terms of telephonic calls or the like, such innovation may also be practiced in connection with any other appropriate type of communications medium and other types of call, perhaps with suitable modification. Likewise, although the present innovation is set forth with reference to the use of live agents 22, such live agents 22 need not necessarily be employed, in which case suitably programmed automated agents 22 may be employed. It should be understood, therefore, that this innovation is not limited to the particular embodiments disclosed, but it is intended to cover modifications within the spirit and scope of the present innovation as defined by the appended claims.

The invention claimed is:

1. A method performed by a computing system of a call center established to answer calls from callers reporting incidents and dispatch responders in response thereto, the method comprising:
receiving a particular call from a caller regarding a particular incident;
determining whether the particular call is an original call that is reporting the particular incident for a first time to the call center, or is a repetitive call that is reporting the particular incident after the original call for the particular incident has already been received by the call center;
forwarding the particular call to an agent at the call center for further attention if the particular call is an original call; and
diverting the particular call from the agent at the call center if the particular call is a repetitive call,
wherein resources of the call center may be concentrated on original calls and away from repetitive calls,
the method comprising the computing system:
obtaining from the particular call a geographic location thereof;
searching a database of previously reported incidents for any previously reported incident that is relatively recent and where the previously reported incident has a corresponding location that is relatively close to the geographic location of the particular call;
determining that the particular call is at least potentially an original call if no previously reported incident is found in the database that is relatively recent and that has a corresponding location that is relatively close to the geographic location of the particular call, and if so forwarding the particular call as an at least potentially original call to an agent at the call center for further processing; and
determining that the particular call is at least potentially a repetitive call if a previously reported incident is found in the database that is relatively recent and that has a corresponding location that is relatively close to the geographic location of the particular call, and if so confirming same with the caller of the particular call,
the method comprising determining that a previously reported incident in the database is relatively recent according to a parameter that varies based on a type of the previously reported incident,
the method comprising determining that a previously reported incident in the database has a corresponding location that is relatively close to the geographic location of the particular call if the geographic location of the particular call is within a predetermined geographic zone around the corresponding location of the previously reported incident, the predetermined geographic zone corresponding to a type of the previously reported incident and being tailored to the type of the previously reported incident,
the previously reported incident being an auto accident on a highway, the predetermined geographic zone being a relatively larger distance along such highway adjacent the corresponding location of the auto accident and a relatively smaller distance on either side of the highway adjacent the corresponding location of the auto accident, the relatively larger distance being on the order of 10 times larger than the relatively smaller distance.

2. The method of claim 1 wherein the call center is an emergency call center established to answer calls within a predetermined geographic region from callers reporting incidents of an emergency nature.

3. The method of claim 1 wherein the caller calls the call center by way of one of a landline telephone, a mobile telephone, a texting service, an email service, and a radio service.

4. The method of claim 1 comprising determining that the particular call is at least potentially a repetitive call if a geographic location corresponding to the particular call is relatively close to a geographic location of an already reported incident and if the already reported incident is relatively recent.

5. The method of claim 1 comprising determining that the particular call is at least potentially a repetitive call if a geographic location corresponding to the particular call is relatively close to a geographic location of an already reported incident and if the already reported incident is relatively recent, and if the caller of the particular call confirms that the particular incident of the caller is the already reported incident.

6. The method of claim 1 comprising automatically obtaining from the particular call the geographic location thereof by way of obtaining a spatial location thereof as determined at a calling device employed by the caller of the particular call, as determined by cell phone tower triangulation techniques, or as determined by an address associated with the calling device.

7. The method of claim 1 comprising determining that a previously reported incident in the database is relatively recent if the elapsed time since such previously reported incident is less than a set amount of time.

8. The method of claim 1 comprising determining that a previously reported incident in the database is relatively recent if the elapsed time since such previously reported incident is less than a set amount of time corresponding to a type of the previously reported incident.

9. The method of claim 1 comprising determining that a previously reported incident has a corresponding location that is relatively close to the geographic location of the particular call if a calculated distance therebetween is less than a set distance.

10. The method of claim 1 comprising determining that a previously reported incident has a corresponding location that is relatively close to the geographic location of the particular call if a calculated distance therebetween is less than a set distance corresponding to a type of the previously reported incident.

11. The method of claim 1 comprising determining that a previously reported incident has a corresponding location that is relatively close to the geographic location of the particular call if the geographic location of the particular call is within a predetermined geographic zone around the corresponding location of the previously reported incident.

12. The method of claim 1 wherein, upon determining that the particular call is at least potentially an original call and forwarding such at least potentially original call to an agent at the call center for further processing, the agent collects information relating to the incident of the particular call and the computing system stores the collected information in the database, whereby a subsequent caller calling the call center regarding the incident of the particular call will be treated as a possible repetitive call.

13. The method of claim 1 wherein confirming with the caller of the particular call that the particular call is a repetitive call comprises querying the caller whether the call is regarding the previously recorded incident found, receiving a positive response, and terminating the particular call.

14. The method of claim 1 wherein confirming with the caller of the particular call that the particular call is a repetitive call comprises querying the caller whether the call is regarding the previously recorded incident found, receiving a negative response, and taking appropriate further action with respect to the particular call.

15. The method of claim 14 wherein the appropriate further action comprises forwarding the particular call as an at least potentially original call to an agent at the call center for further processing.

16. The method of claim 14 wherein the computing system upon searching the database of previously reported incidents finds a plurality of previously reported incidents that are relatively recent and where the previously reported incidents have a corresponding location that is relatively close to the geographic location of the particular call, and wherein the appropriate further action comprises determining whether the incident of the particular call corresponds to the incident of another of the previously reported incidents found in the database.

17. The method of claim 1 wherein the type of the previously reported incident comprises one of smoke, a fire, a gas leak, a crime in progress, an automobile accident, a plane crash, and a train-related accident.

* * * * *